United States Patent
Talvitie et al.

(10) Patent No.: US 6,895,225 B1
(45) Date of Patent: May 17, 2005

(54) SYSTEM FOR MATCHING AN ANTENNA FOR A WIRELESS COMMUNICATION DEVICE

(75) Inventors: Olli Talvitie, Tampere (FI); Saku Lahti, Tampere (FI); Petri Kotilainen, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/537,501

(22) Filed: Mar. 29, 2000

(30) Foreign Application Priority Data

Mar. 29, 1999 (FI) ................................................ 990687

(51) Int. Cl.⁷ ................................................ H04B 1/44
(52) U.S. Cl. ................... 455/78; 455/115.1; 455/115.3; 455/126; 455/127.1; 330/277; 330/302; 330/306; 330/343; 330/860; 330/861; 330/333; 330/32; 330/33
(58) Field of Search .......................... 455/78, 83, 115.1, 455/115.3, 126, 127.1, 129, 550, 115; 330/277, 302, 306; 343/860, 861, 702, 814; 333/32, 33

(56) References Cited

U.S. PATENT DOCUMENTS

| | | | |
|---|---|---|---|
| 3,825,825 A | | 7/1974 | Smolka ...................... 324/57 R |
| 4,041,395 A | | 8/1977 | Hill .............................. 325/133 |
| 4,493,112 A | | 1/1985 | Bruene ........................ 455/123 |
| 5,214,372 A | | 5/1993 | Vaisanen et al. ............... 324/95 |
| 5,335,368 A | * | 8/1994 | Tamura ........................ 455/90 |
| 5,564,086 A | | 10/1996 | Cygan et al. ................ 455/126 |
| 5,715,527 A | * | 2/1998 | Horii et al. .................. 455/126 |
| 5,754,141 A | | 5/1998 | Thompson et al. .......... 343/702 |
| 5,778,308 A | * | 7/1998 | Sroka et al. ................. 455/115 |
| 5,991,608 A | * | 11/1999 | Leyten ........................ 455/121 |
| 6,006,117 A | * | 12/1999 | Hageltorn et al. ....... 455/575.7 |
| 6,016,108 A | * | 1/2000 | Terk et al. .............. 340/825.72 |
| 6,049,310 A | * | 4/2000 | Sadahiro ..................... 343/702 |
| 6,078,794 A | * | 6/2000 | Peckham et al. ......... 455/127.4 |
| 6,081,694 A | * | 6/2000 | Matsuura et al. ............. 455/78 |
| 6,442,379 B2 | * | 8/2002 | Yajima ........................ 455/129 |
| 6,735,418 B1 | * | 5/2004 | MacNally et al. ............. 455/78 |

FOREIGN PATENT DOCUMENTS

| | | | | |
|---|---|---|---|---|
| EP | 0505716 A3 | | 9/1992 | |
| JP | 11308142 | * | 11/1999 | |
| JP | 02000124723 A | * | 4/2000 | ............ H01Q/1/27 |
| WO | WO 96/37967 | | 11/1996 | |
| WO | WO 98/29968 | | 8/1998 | |

* cited by examiner

Primary Examiner—William Trost
Assistant Examiner—Danh Le
(74) Attorney, Agent, or Firm—Perman & Green, LLP (57) ABSTRACT

The invention relates to a system for matching an antenna (ANT) for a wireless communication device, the system comprising: detecting means (4, 5, 12) to detect the matching of the antenna (ANT) and to generate a matching signal on the basis of the detected matching, control means (7) to examine said matching signal, to determine the need for matching, and to generate a control signal on the basis of said matching signal, and antenna matching means (9) to adjust the matching of the antenna (ANT) on the basis of said control signal. The invention relates also to a wireless communication device and a method for matching the antenna of a wireless communication device.

12 Claims, 7 Drawing Sheets

SYSTEM FOR MATCHING AN ANTENNA FOR A WIRELESS COMMUNICATION DEVICE

The present invention relates to a system for matching an antenna for a wireless communication device. The invention relates also to a wireless communication device comprising at least an antenna, as well as a method for matching an antenna for a wireless communication device.

In most common mobile communication systems, a base transceiver station controls the transmission output on the basis of the level of the received signal. Close to the base transceiver station, the transmission output of the wireless communication device is small, whereas at the extreme limits of the service area, the transmission output of the wireless communication device is at its maximum. Consequently, the power consumption of the wireless communication device is highly dependent on the location of use of the device.

Also, various obstructions particularly in the direct vicinity of the wireless communication device suppress the signal of the transmitter. The base transceiver station compensates this attenuation by raising the transmission power of the wireless communication device. Thus, e.g. a poor position of use of the wireless communication device, such as the antenna too close to the user's head, may cause an unnecessary increase in the power consumption. The same problem occurs also when the user is turned so that his/her head is between the base transceiver station and the antenna of the wireless communication device.

A third factor affecting the strength of the signal received by the base transceiver station is the position of the antenna of the wireless communication device. The antennas of the base transceiver stations are typically directed to transmit and receive vertically polarized signals, wherein the signal received by the base transceiver station is at its strongest when the antenna of the wireless communication device is in the vertical position. If the user keeps the wireless communication device in an inclined or even horizontal position, the signal received by the base transceiver station is weakened, wherein the base transceiver station must increase the transmission power of the wireless communication device again.

Furthermore, the strength of the signal received by the base transceiver station is affected by the fact that the impedance of the antenna of the wireless communication device changes in different situations of use. For example, electroconductive objects, such as metal objects, in the vicinity of the wireless communication device may change the impedance of the antenna. The impedance of the antenna is also affected by the fact whether the wireless communication device is held in bare hands or in hands wearing gloves.

Also, there are known wireless communication devices in which the position of use of the antenna can be changed according to the need. For example, the antenna can be inserted in the casing in the situation in which the wireless communication device is in a standby state. Correspondingly, the antenna can be lifted up to the use position, out of the casing, in a situation of use. In these different positions of the antenna, the impedance is different in wireless communication devices of prior art.

In wireless communication devices according to prior art, the matching of the antenna is designed in view of a certain use position. If the matching is designed for the standby state, the antenna functions best in a position corresponding to the standby state, but in the use position the matching of the antenna is not the best possible. With such matching, the receiver of the wireless communication device detects an incoming call also at a longer distance from the base transceiver station than in a situation in which the matching is designed to suit best the position of use. However, this alternative involves the drawback that in the use situation, transmission output is wasted as a result of the unideal matching.

In wireless communication devices according to prior art, the matching of the antenna can also be designed so that the matching is best when the antenna is in the use position, wherein losses of the radio-frequency signal to be transmitted during a call are smaller than in a situation in which the matching is optimized for the standby state. On the other hand, the receiver of the wireless communication device does not work as well when the antenna is in the standby state as in the use position, wherein particularly in a weaker base station field, part of the incoming calls may be left undetected.

Figure 1:
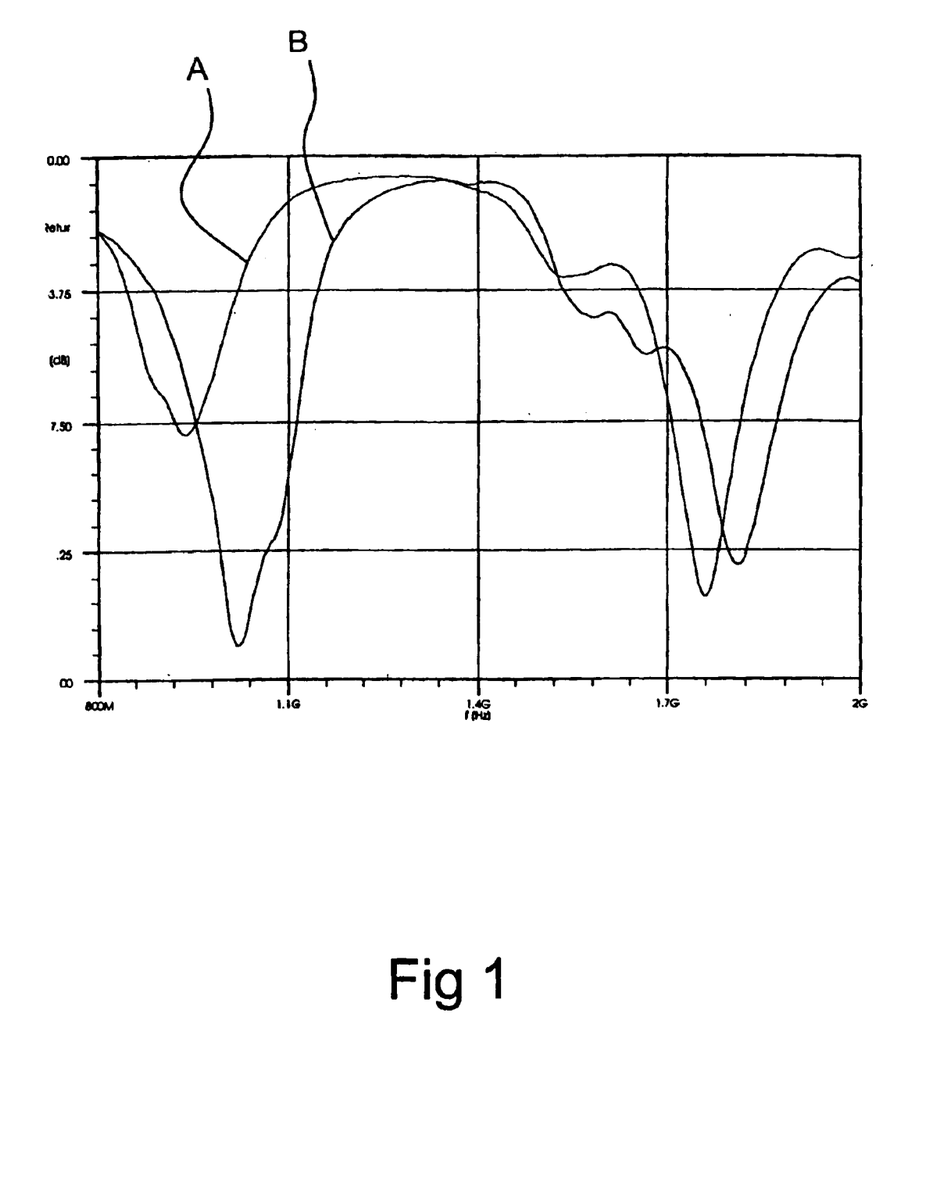
FIG. 1 shows the matching of a wireless communication device of prior art as a function of frequency in different functional positions.

As an example, the appended FIG. 1 shows the antenna matching of a wireless communication device. Curve A illustrates the optimization of the matching for the standby state, and curve B the optimization of the matching for the use situation, respectively. In the coordinates, the horizontal axis represents the frequency and the vertical axis the matching on the basis of the output reflected from the antenna. The matching is the better the smaller part is reflected back from the antenna. From the curves of FIG. 1, it can be deduced e.g. that the optimal matching of the antenna in the standby position is at the frequencies of ca. 950 Mhz and ca. 1.75 GHz, and correspondingly in the use position at the frequencies of ca. 1.0 GHz and 1.8 GHz. In addition to the fact that the matching of the antenna is changed in different use positions, also the frequency at which the best matching is achieved is changed. This drawback can be reduced to some extent by optimizing the matching of the antenna in a way that it functions reasonably both in the standby position and in the use position, but then the matching of the antenna is not the best possible in either of the positions.

It is an aim of the present invention to present a system in which the matching of the antenna is adjusted to suit different positions of use, as well as a wireless communication device, in which the matching of the antenna is adjusted according to the use conditions. The invention is based on the idea of measuring at least the radio frequency reflected from the antenna and adjusting the matching of the antenna on the basis of this measurement. The matching system according to the present invention is characterized in that it comprises:
   detecting means to detect the matching of the antenna and to generate a matching signal on the basis of the detected matching,
   control means to examine said matching signal, to determine the need for matching, and to generate a control signal on the basis of said matching signal, and
   antenna matching means to adjust the matching of the antenna on the basis of said control signal.

The wireless communication device according to the present invention is characterized in that the wireless communication device also comprises:
   detecting means to detect the matching of the antenna and to generate a matching signal on the basis of the detected matching,
   control means to examine said matching signal, to determine the need for matching, and to generate a control signal on the basis of said matching signal, and antenna matching means to adjust the matching of the antenna on the basis of said control signal.

The method according to the present invention is characterized in that in the method, the matching of the antenna is detected, a matching signal is generated on the basis of the detected matching, said matching signal is examined to determine the need for matching the antenna, wherein a control signal is generated on the basis of said matching signal, and the matching of the antenna is adjusted on the basis of said control signal.

By using the present invention, considerable advantages are achieved in comparison with systems and wireless communication devices of prior art. In the wireless communication device according to the invention, different use positions can be taken into account in the design of the matching of the antenna, wherein in different situations of use of the wireless communication device, the matching of the antenna is as good as possible. Thus, the wireless communication device according to the invention functions well in the standby state also in a weak signal field and, correspondingly, in the use situation the quantity of radio output reflected back from the antenna is adjusted as small as possible, wherein it is possible to reduce the power consumption of the wireless communication device.

In the following, the invention will be described in more detail with reference to the appended drawings, in which.

Figure 2:
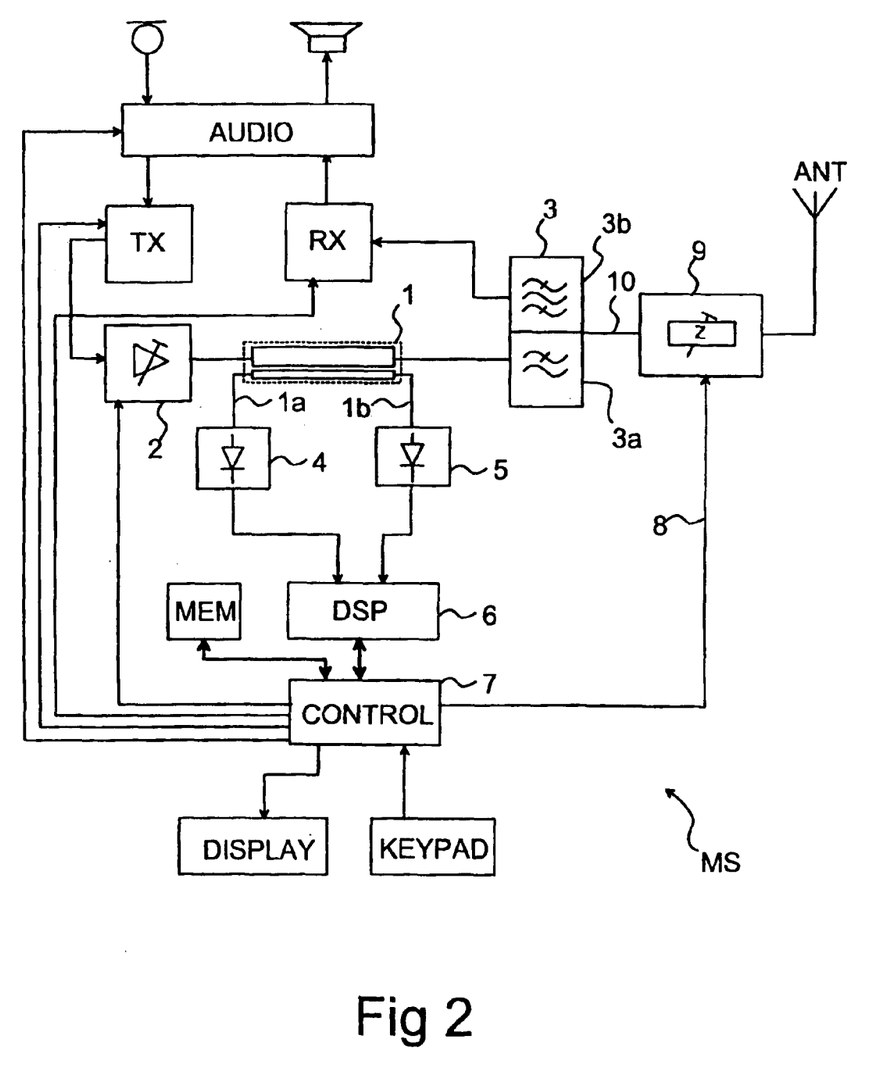
FIG. 2 is a reduced block chart showing a wireless communication device according to an advantageous embodiment of the invention.
Figure 5:
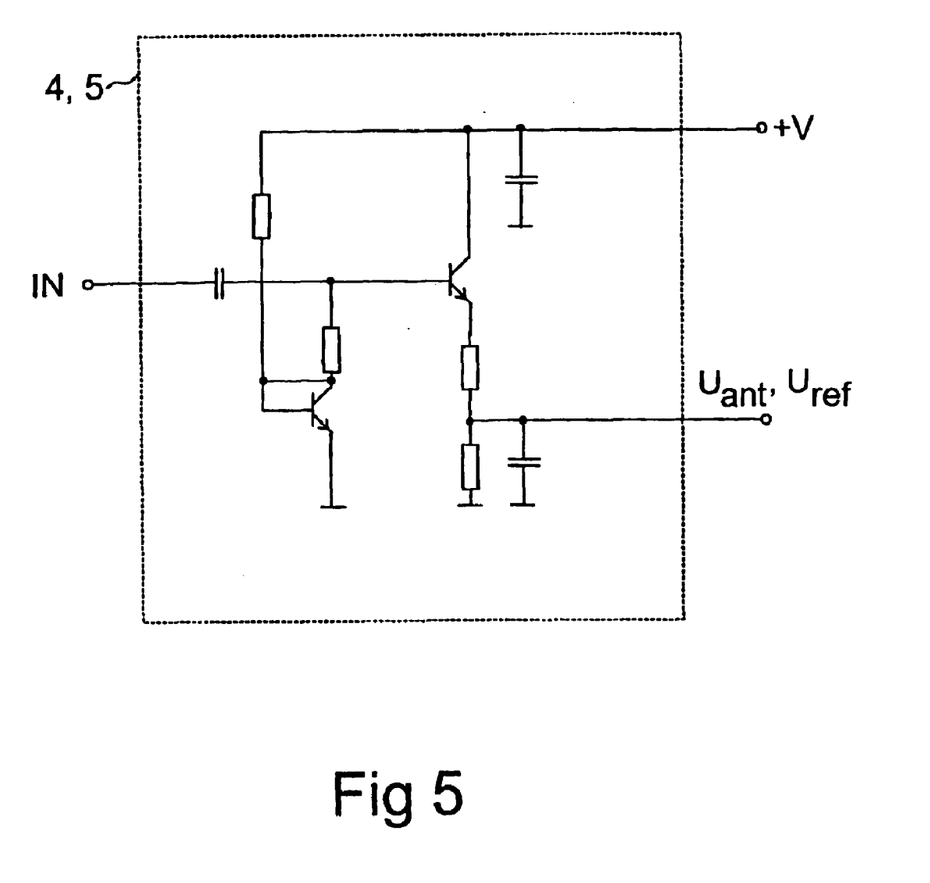
FIG. 5 shows an output detecting connection according to prior art.

FIG. 2 is a reduced block chart showing a system according to an advantageous embodiment of the invention. The system comprises a directional coupler 1 which is placed in a transfer line between the power amplifier 2 and the duplex filter 3 of the transmitter. In the directional coupler 1, there are two outputs in addition to the connections of the transfer line, the signal level of the first output 1a being proportional to the signal level passing from the power amplifier 2 to the antenna ANT, and the signal level of the second output 1b being proportional to the signal level passing from the antenna ANT to the power amplifier 2, i.e. the signal level reflected from the antenna. The first output 1a is coupled to an outgoing power detector 4, and the second output 1b is coupled to a reflected power detector 5. In the output of the outgoing power detector 4 there is a DC (direct-current) voltage $U_{ant}$ proportional to the power of the radio-frequency signal to be transmitted to the antenna, and in the output of the reflected power detector 5 there is a DC voltage $U_{ref}$, proportional to the power of the radio-frequency signal reflected to the power amplifier 2. FIG. 5 shows a detector coupling 4, 5 according to prior art, suitable for use in the system of the invention. The operation of this coupling is described in more detail in U.S. Pat. No. 5,214,372. In the system of the invention, it is also possible to use any other measuring and detecting coupling of prior art. As an example, the use of a rectifier diode should be mentioned, wherein a pulsating DC voltage rectified with a diode is measured and used to determined the effective value. If necessary, it is also possible to use a capacitor in addition to the diode, to stabilize fluctuations in the voltage, which is known as such.

The DC voltage $U_{ant}$ obtained from the output of the outgoing power detector 4 is led to a signal processing means 6, in which the voltage value is converted preferably to digital form and the effective value and/or short-term average of the voltage is calculated. In a corresponding manner, the DC voltage $U_{ref}$ obtained from the output of the reflected power detector 5 is led to the signal processing means 6 and converted to digital form. Also from this DC voltage describing the reflected power quantity, the effective value and/or short-term average of the voltage is advantageously calculated. The effective and/or average values calculated from the voltages $U_{ant}$, $U_{ref}$ are led to a control means 7.

In the duplex filter 3, harmonic frequencies, i.e. multiples, of the signal to be transmitted are attenuated with a low pass filter 3a, and the signal to be transmitted is prevented from entering the receiver RX. The signal to be transmitted from the duplex filter is led via a supply line 10 to be transmitted to the antenna ANT.

In a corresponding manner at the receiving stage, the radio-frequency signals received from the antenna ANT are led via the supply line 10 to the duplex filter 3, in which a band-pass filter 3b is used to filter out frequencies outside the receiving frequency range. The radio-frequency signals within the receiving frequency range are led from the duplex filter 3 to the receiver RX to be received in a way known as such.

In a time division multiple access (TDMA) system, such as the GSM cellular system, each wireless communication device transmitting on the same radio channel in the area of the same cell is allocated certain transmission time slots and certain receiving time slots, which are different, as is known as such. Thus, the control means 7 has information on the time slots in which the wireless communication device in question is allowed to transmit and the time slots in which the wireless communication device receives the radio signal transmitted by the base transceiver station. The adjustment of the matching of the control means 7 in the running application software can thus utilize this information to determine the correct moment of time for measuring the outgoing and reflected power. In a wireless communication device according to a second advantageous embodiment of the invention, this information is used to determine the moment of time at which the strength of the received signal is measured.

On the other hand, for example in a code division multiple access (CDMA) system, several wireless communication devices can transmit simultaneously, wherein the transmitting and reflected power can be measured substantially continuously during the connection.

The following is a description of the operation of the method according to a first advantageous embodiment of the invention in a wireless communication device MS. In the method, the adjustment of the matching is based on measuring the power reflected from the antenna during the transmission. In the adjustment, it is also possible to measure the power to be transferred from the power amplifier to the antenna of the transmitter. Upon starting the wireless communication device MS, a matching means 9 is set e.g. at a first matching value, which in this example is optimized as matching corresponding to the standby state of the antenna, but it can also be matching corresponding to e.g. the position of use of the antenna. The first matching value of the matching means 9 is set advantageously so that the control means 7 sets in the control line 8 of the matching means a first voltage value, such as a voltage value corresponding to the logical 0 state, which in the examples described in this specification corresponds to the voltage value of ca. 0 V. The application software of the control means 7 is equipped with a program for executing the matching. During the operation of the wireless communication device MS, the control means 7 runs this application program at intervals to examine and adjust the need for matching if necessary.

When the matching adjustment is made solely on the basis of the power reflected from the antenna, it can be implemented e.g. in the following way. The control means 7 sets in the control line 8 of the matching means a first voltage value, wherein a first matching value is set in the matching means 9. After this, the power of the reflected radio-frequency signal is determined by measuring the output voltage $U_{ref}$ of the reflected power detector 5 at the stage when power is led to the antenna. On the basis of the measurement, in the signal processing means 6, the voltage is converted into digital format, and the effective value of the voltage is advantageously calculated and stored in memory means MEM, preferably in a random access memory (RAM). Next, the control means 7 sets in the control line 8 of the matching means a second voltage value, whereby a second matching value for the matching means 9 is selected for the matching means 9, after which the reflected power is measured again and the measurement result is stored in the memory means MEM. This second voltage value is preferably a voltage value corresponding to the logical 1 state, which in practical solutions normally corresponds approximately to the operating voltage, such as 3 V, 3.3 V or 5 V. After going through all the possible matching values of the matching means, the control means 7 compares the effective values calculated on the basis of the measurements with different matchings. On the basis of the comparison, the control means 7 sets in the control line 8 of the matching means the value which corresponds to the matching of the matching means 9 at which the effective value of the reflected radio-frequency signal was the lowest.

The change of the matching can also be implemented for example in such a way that the matching means 9 comprises two or several alternative matching circuits, of which one is selected at a time with a switch or the like. Thus, the matching control line 8 may comprise several lines, of which one or several are selected to be active, which results in the activation of the respective matching circuit. Also other known solutions can be applied in this context. The implementations of the matching means 9 to be applied in connection with the present invention will be described hereinbelow.

Because the use conditions of the antenna may change also during a call and in the standby state, it is reasonable to perform the measurements and control operations required for executing the matching at intervals. Thus, one criterion to change the matching can be that the quantity of the power to be reflected changes more than a predetermined threshold value, e.g. a certain decibel quantity, or that the quantity of the power to be reflected in relation to the output changes more than a predetermined threshold value. Thus, preferably the signal processing means 6 is used to measure at intervals the power reflected from the antenna, and if the reflected output exceeds the predetermined threshold value, the control means 7 changes the matching of the matching means 9. After this, a new determination is made on the reflected power and compared with the power according to the preceding matching. If the reflected power decreased with this new matching, the matching of the antenna is kept at this value. In another case, if there are only two matching alternatives in the matching means 9, the matching is returned back to the preceding matching value. However, if there are more than two matching alternatives in the matching means 9, the next matching alternative is set in the matching means 9 and a new step of determining and comparing the reflected power is made, until a matching is found again, at which the reflected power is the smallest.

In the evaluation of the need for adjusting the matching, it is also possible to utilize the power to be transmitted in addition to the power reflected from the antenna. Thus, the control means 7 is used to compare the power of the radio-frequency signal to be transmitted from the output amplifier of the transmitter with the power of the radio-frequency signal reflected from the antenna, and on the basis of this comparison, it is deduced whether it is necessary to change the matching of the antenna. If a major part of the radio-frequency signal led to the antenna is reflected back, it is probably due to poor matching of the antenna. Thus, the control means 7 sets in the matching control line 8 a signal, whereby the matching of the matching means 9 of the antenna is changed.

After the control means 7 has set a new matching value in the matching means 9, it is possible to execute a new power measurement of the reflected radio-frequency signal and the radio-frequency signal to be transmitted from the output amplifier. Now, if the measurement of the reflected power indicates that less of the radio-frequency signal is reflected in relation to the output power, it can be deduced that the matching is better than in the previous measurement. If necessary, it is also possible to try another matching alternative and to execute the above-described measuring and comparing operations to find out if a still better matching can be achieved with another matching, i.e. if the quantity of the reflected power can be reduced. Said adjustment of the matching can be made e.g. on the basis of the average value of the power measured over each transmission time slot, or on the basis of the average power measured over several such transmission time slots, wherein momentary changes in the environment of use of the antenna do not substantially affect the adjustment of the matching of the antenna.

In practical applications, an advantageous way to implement the matching means 9 and its control is to use PIN diodes as the switching means and capacitances and/or inductances as the matching means. By using PIN diodes in the switching of the high-frequency signal, e.g. the advantages is achieved that the antenna feeding line can be utilized in the control of the switches. Thus, a DC voltage to be supplied into the antenna feeding line is used to bias the diodes in a desired way, as will be presented below in this description.

Figure 3A:
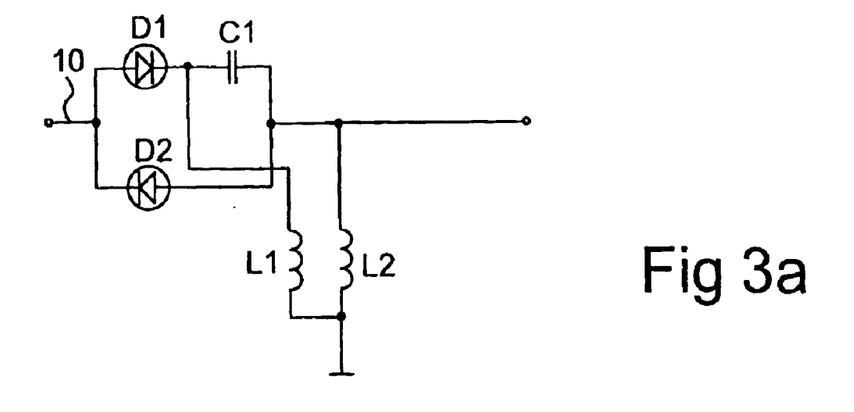
FIGS. 3a–3c show various matching circuits for an antenna.
Figure 3B:
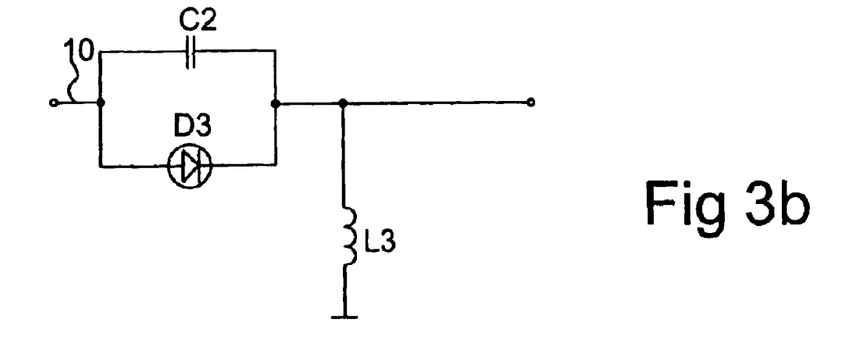
Figure 3C:
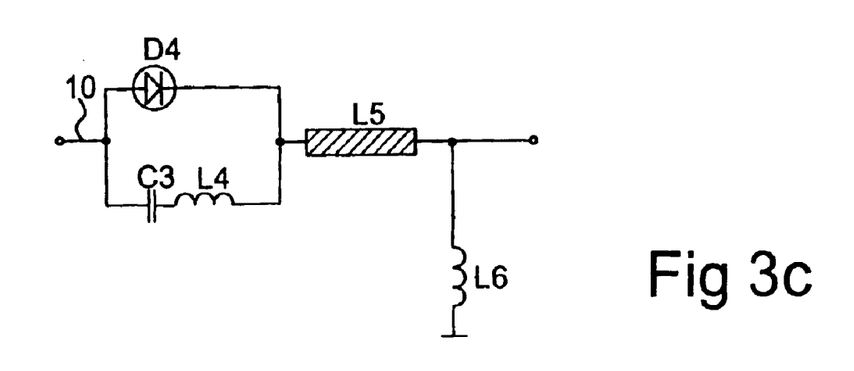

The antenna of the wireless communication device according to the invention can be optimized at the designing stage either in view of either the standby state or the use position. Thus, the matching means 9 is used to change the matching of the antenna at the stage when the antenna is placed in another position. In view of the entirety, the aim in practical solutions is to make the matching means 9 as simple as possible, wherein a perfect matching is not necessarily achieved. On the other hand, a perfect matching normally requires a complex coupling, wherein the losses in the matching means may become greater than the benefit obtained with the matching. The appended FIGS. 3a–3c show some advantageous solutions for implementing the matching means 9 and its control. In FIGS. 3a and 3b, the antenna is optimized in the position of use of the wireless communication device, and the coupling illustrated in FIG. 3c is applicable for use in the alternative when the antenna of the wireless communication device is optimized in the position of standby state.

In the coupling of FIG. 3a, the matching means 9 consists of a capacitor C1. This capacitor C1 compensates the change in the resonance frequency, when the antenna is set in the standby state. Diodes D1 and D2 function as switching means in the following way. A positive DC voltage is led into the antenna supply line 10, wherein a bias current is passed through the first diode D1 and a first limiter L1 from the supply line to the ground potential. This bias current sets the first diode D1 in a conductive state, wherein a high-frequency current is passed from the supply line through the first diode D1 and the capacitor C1 to the antenna ANT. In a corresponding manner, when a negative DC voltage is set in the supply line 10, the bias current is passed from the ground potential through a second limiter L2 and the second diode D2 to the supply line 10, wherein the second diode D2 is biased, i.e. it is conductive, and, correspondingly, the first diode D1 does not conduct high-frequency power. Thus, the high-frequency current is passed from the supply voltage 10 through the second diode D2 to the antenna ANT. In this latter case, the capacitor C1 does not affect the matching of the antenna. The limiters L1, L2 prevent the short-circuiting of the high-frequency signal to the ground potential.

In the example coupling of FIG. 3b, only one diode D3 is used as a switching means and a capacitor C2 as the matching means. In case a DC voltage is not passed to the supply line 10, the diode D3 does not conduct high-frequency power either, wherein the high-frequency power to be led via the supply line 10 to the antenna is passed through the capacitor C2, wherein the antenna matching is composed of this capacitor C2. In a situation when a positive DC voltage is coupled into the supply line 10, the diode D3 starts to conduct high-frequency power, and thus the high-frequency signal to be transmitted is passed via the diode D3 to the antenna, and the capacitor C2 is short-circuited with respect to the high-frequency power. Thus, the capacitor C2 does not substantially affect the matching of the antenna. A limiter L3 leads the bias current to the ground potential and prevents the short-circuiting of the high-frequency signal to the ground potential. It is an advantage of this coupling of FIG. 3b with respect to the coupling of FIG. 3a that the bias current is only needed during a call, when the antenna of the wireless communication device is in the use position.

FIG. 3c shows an example coupling for such a wireless communication device in which the antenna is optimized according to the use position of the antenna. In the matching means according to this coupling, a bias current is supplied to the supply line 10 for a diode D4 in a situation when the antenna is in the standby position. Thus, the high-frequency power is passed through the diode D4 to the antenna. Also, an inductance L5 is formed between the matching means 9 and the antenna, preferably by the microstrip technique. Moreover, in the coupling of FIG. 3c, a second matching means used is a coil L4 in a situation when no bias voltage is passed into the supply line 10, wherein the high-frequency power is passed via the capacitor C3 and the coil L4 to the inductance L5 and further to the antenna ANT.

The respective position of the antenna ANT of the wireless communication device can be detected e.g. in such a way that the antenna is provided with a switch whose position is monitored. Thus, on the basis of a signal given by the switch, either the first or second functional state of the matching means is selected. Another alternative is to measure the power reflected from the antenna to deduce in which position the matching means 9 is placed each time. This function has been described above in the description of the present invention. Yet another alternative is to monitor the strength of the received signal and to try to find, by the control of the matching means 9, such a position in which the strength of the received signal is the greatest.

Figure 6:
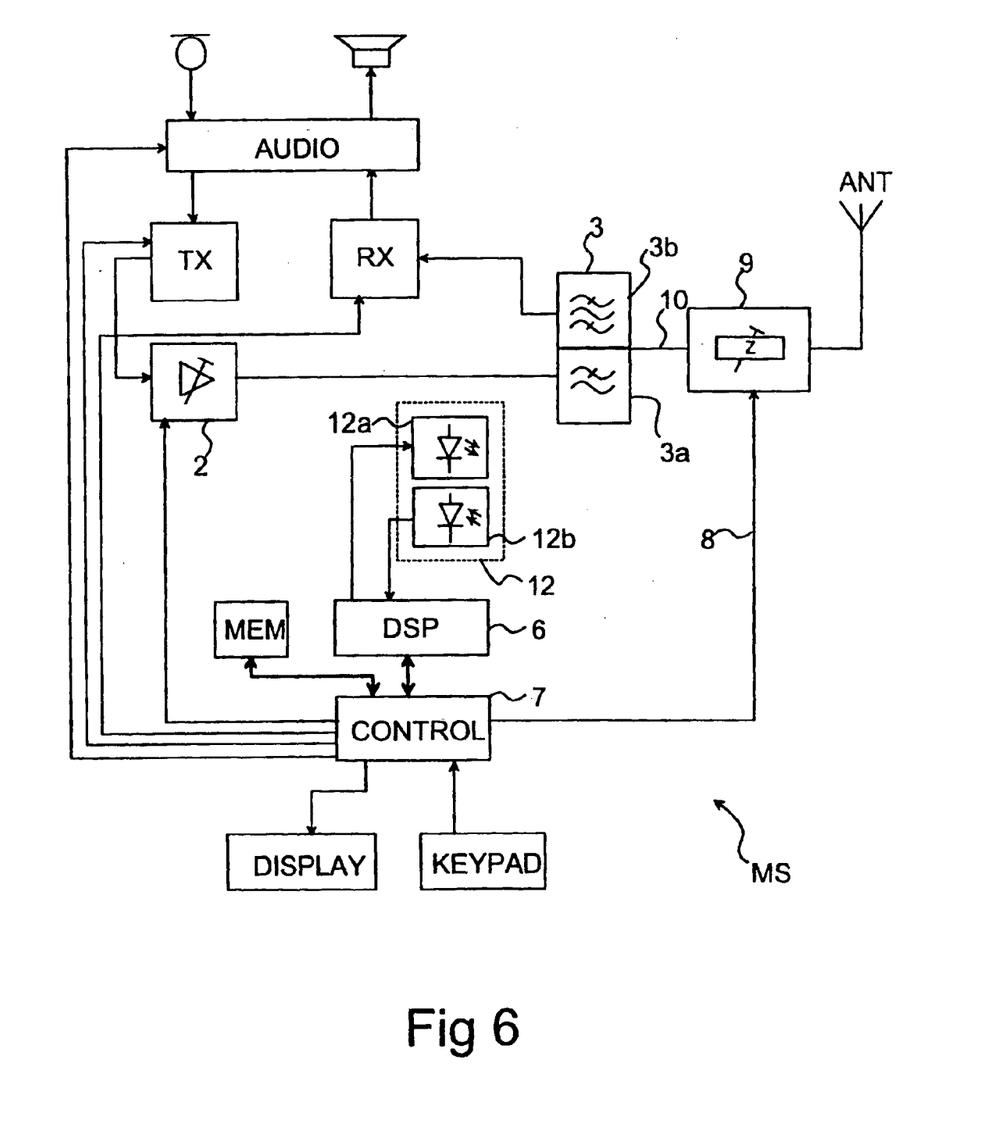
FIG. 6 is a reduced block chart showing a wireless communication device according to a second advantageous embodiment of the invention.

The adjustment of the antenna matching according to the present invention can be advantageously implemented also in such a way that a so-called proximity sensor 12 is used to measure the distance of the wireless communication device from obstacles in the vicinity. On the basis of this distance measurement, the matching of the antenna is adjusted. The distance measurement can be implemented e.g. so that the proximity sensor 12 in the wireless communication device MS comprises an infrared transmitter 12a and an infrared receiver 12b, as shown in FIG. 6. The infrared transmitter 12a is used to transmit an infrared signal (IR) from the wireless communication device MS to the environment. The infrared receiver 12b is used to receive the reflected infrared signal, and e.g. the signal processing means 6 is used to measure the strength of the received signal and also the strength of the transmitted infrared signal, if necessary. Thus, it can be deduced from the ratio between the strength of the received signal and the strength of the transmitted infrared signal, whether there is an obstacle in the vicinity of the wireless communication device MS. Obstacles in the vicinity of the wireless communication device MS reflect a major part of the signal. If the measurement indicates that a major part of the transmitted infrared signal is reflected, it can be deduced that the wireless communication device is close to an obstacle, and the matching of the antenna is changed accordingly, e.g. by selected one of two or more matching circuits. In each application, it is preferably empirically established, how the distance and size of obstacles affects the quantity of the reflected infrared signal as well as how the antenna matching should be changed. Thus, the respective reference values to be used in the adjustment of the matching are advantageously stored in the wireless communication device MS. The reference values stored in the memory means MEM are preferably compared with the measurement result by the control means 7, which generates a control signal to set a suitable matching value in the matching means 9. This setting of the matching on the basis of the control signal is described elsewhere in this description, which is referred to in this context. It is obvious that instead of said infrared signal, it is also possible in the proximity sensor 12 to use another principle for measuring the distance, such as ultrasound.

Figure 7:
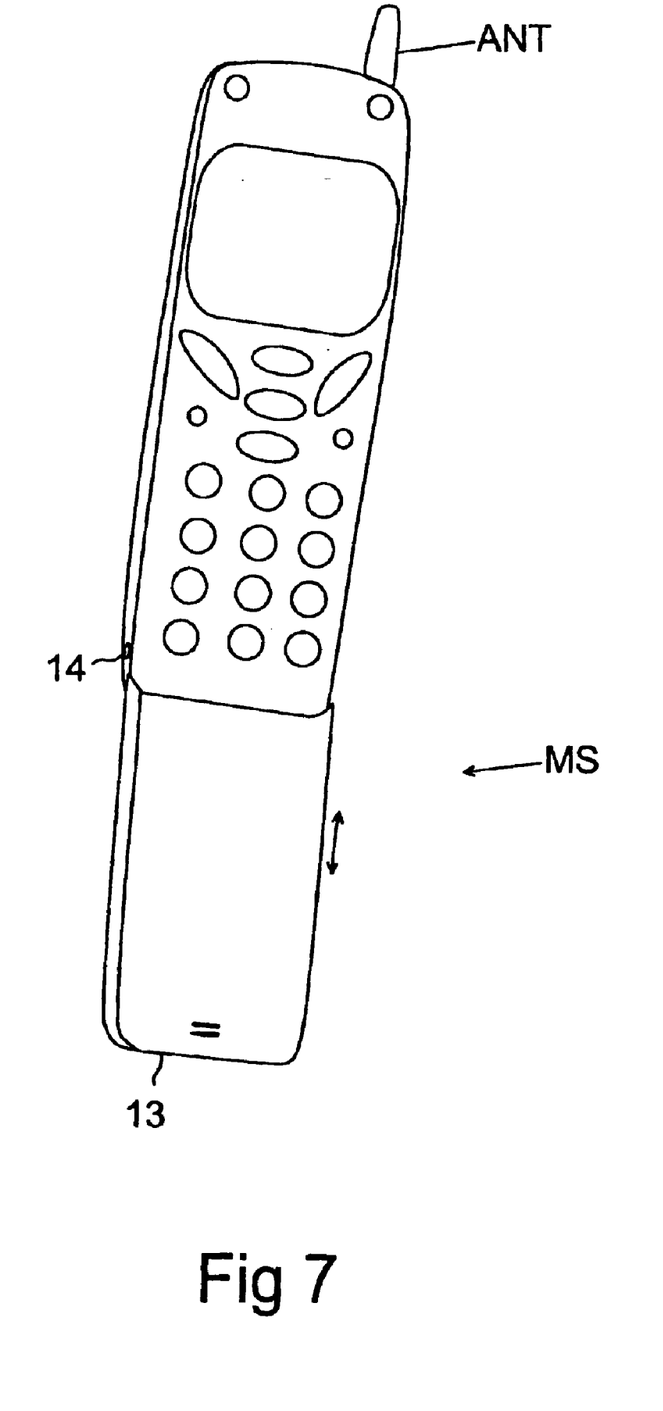
FIG. 7 is a perspective view showing a wireless communication device according to a third advantageous embodiment of the invention.

Yet another embodiment of adjusting the antenna matching to be mentioned in this context is one in which the wireless communication device MS comprises a movable keypad cover 13 (FIG. 7) or the like. Such a keypad cover is usually placed to cover the keypad when there is no call going on. In a corresponding manner, for the time of a call, the keypad cover is placed in another position, off the keypad. This position of the keypad cover is examined e.g. with a switch means 14, wherein when the keypad cover is on the keypad, a first matching value of the matching means 9 is used in the antenna matching, and, correspondingly, when the keypad cover is off the keypad, a second matching value of the matching means 9 is used in the antenna matching. Consequently, it is presumed here that during a call, the user keeps the wireless communication device MS close to his/her head, wherein the effect of the head in the antenna matching can be taken into account.

The method based on measuring the power reflected from the antenna is advantageous for example because the antenna matching can thus be made the best-possible at the transmission frequency. Typically, the significance of the antenna matching is greater in transmission than in reception, because upon transmission from a wireless communication device, various unideal features affect the power consumption in the wireless communication device more than possible unideal features in the antenna matching at the receiving stage. Furthermore, making the antenna matching as good as possible is important in view of the stability of the power amplifier of the transmitter.

Figure 4A:
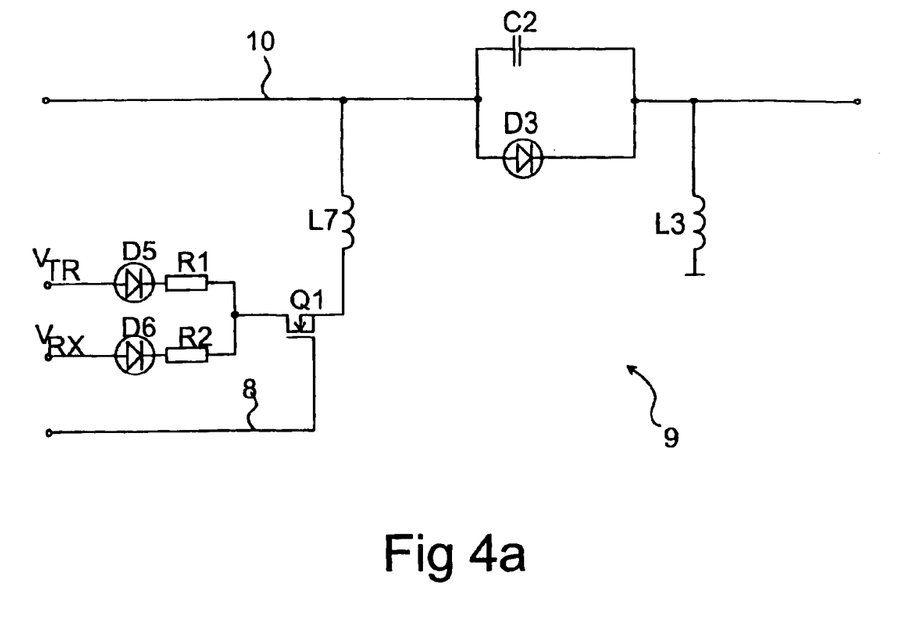
FIGS. 4a–4b show some advantageous examples of switch solutions to be used in connection with the antenna matching of the invention.
Figure 4B:
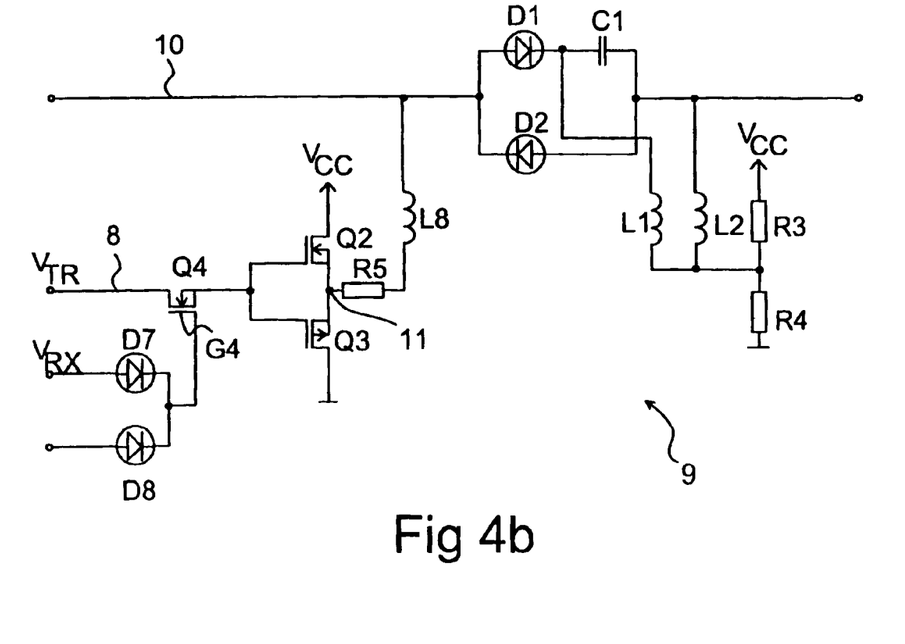

With reference to FIGS. 4a and 4b, the following is a description on some advantageous coupling solutions for coupling a bias current to the supply line in the control of the matching means 9. The coupling of FIG. 4a is applicable for use in a situation in which the matching means 9 comprises one diode functioning as the coupling means, such as diode D3 in the coupling of FIG. 3b and diode D4 in the coupling of FIG. 3c. In the coupling of FIG. 4a, the means used for coupling a bias voltage is a transistor Q1. When the control means 7 sets in the control line 8 of the matching means a voltage value corresponding to the logical 1 state, which is in practical solutions a value corresponding approximately to the operating voltage, the transistor Q1 starts to conduct. Thus, at the transmission stage, the transistor Q1 switches a voltage from the operating voltage line VTX of the transmitter via a diode D5 and a resistance R1 through a limiter L7 to the supply line 10, wherein the diode D4, D5 starts to conduct. In a corresponding manner at the receiving stage, the bias voltage is coupled from the operating voltage VRX of the receiver via a diode D6, a resistance R2, a transistor Q2, and the limiter L7 to the supply voltage line.

To set the matching means 9 in a second matching value, the control means 7 sets in the control line 8 of the matching means preferably a value corresponding to the logical 0 state, in practice ca. 0 V. Thus, the switching transistor Q1 does not conduct, wherein the bias voltage from the supply line 10 is cut, and the diode D3 of the matching means does not conduct high-frequency power to the antenna. Thus, the second matching value of the matching means 9 is in use, i.e. the high-frequency power is passed to the antenna via the capacitor C1.

The coupling solution according to FIG. 4b is suitable for use particularly in connection with such matching means, in which the selection of each matching means is controlled with a diode D1, D2. The coupling works in the following way. The coupling comprises two switching transistors Q2, Q3, which are used to conduct to the supply line 10 the bias voltage required for achieving the matching needed each time. These switching transistors Q2, Q3 are coupled in series between the operating voltage $V_{cc}$ and the ground potential. The output of the bias voltage is implemented from a pin 11 common to the transistors. From this pin 11, the bias voltage is conducted via a resistance R5 and a limiter L8 to the supply line 10. This transistor coupling is implemented in such a way that only either of the transistors Q2, Q3 is conducting. Thus, the supply line 10 is supplied with either the voltage value substantially corresponding to the operating voltage, or the voltage value substantially corresponding to the ground potential, i.e. in practice ca. 0 V. The control signal to these switching transistors Q2, Q3 is passed from the control line 8 of the matching means via a transistor Q4. In the transistor Q4 used as the switch, a grid G4 is used as the enabling input for the switch, wherein the switching transistor Q4 conducts in the case that the operating voltage is coupled to either the transmitter or the receiver of the wireless communication device. The operating voltage of the transmitter is led to the grid G4 in the switching transistor Q4 via a diode D7, and in a corresponding manner, the operating voltage of the receiver is led via a diode D8 from the operating line RXP of the receiver. In a case in which neither the receiver or the transmitter is operating, also matching is unnecessary, wherein the switching transistor Q4 does not conduct, which results in that also the transistors Q2, Q3 do not conduct.

The coupling arrangement of FIG. 4b works in connection with the matching coupling of FIG. 3a in the following way. When the transmitter or the receiver is on and the voltage value set in the control line 8 of the matching means is approximately 0 V, the switching transistors Q4, Q2 are conducting, wherein the supply line 10 has a DC voltage whose magnitude is approximately the operating voltage $V_{cc}$. Thus, the diode D1 of the matching means 9 is biased, i.e. it conducts a high-frequency power via the capacitor C1 to the antenna ANT. In a corresponding manner, when the control line 8 of the matching means has a voltage value corresponding approximately to the operating voltage $V_{cc}$, the switching transistors Q4, Q3 are in a conducting state and have the effect that the supply line 10 is close to the ground potential. Thus, the second diode D2 of the matching means 9 is biased and conducts a high-frequency power to the antenna ANT, i.e. the second matching value of the matching means 9 is in use. The purpose of the resistances R4, L5 is to set the connection line of the diodes D1, D2 on the antenna side at a voltage value which is approximately half of the operating voltage $V_{cc}$. Thus, a negative operating voltage does not need to be supplied to the supply line 10 to bias the second diode D2, but the biasing is accomplished by setting the voltage in the supply line at ca. 0 V. Also in a case that the switching transistor Q1 of the switching means does not conduct electricity, the biasing of the diodes D1, D2 is prevented with this resistance coupling R4, R5. In this situation, the pin common to the transistors Q2, Q3 is also at the voltage value which is approximately half of the operating voltage. Thus, the voltage over the diodes D1, D2 is ca. 0 V.

In the coupling of FIG. 4b, the transistor Q1 and the diodes D7, D8 are not necessarily needed, if there is a possibility in the control means 7 to set the connection line to be used in the control of the control line 8 of the matching means in a so-called high impedance state. Thus, it is examined in the application software of the control means 7, whether both the transmitter and the receiver are off, wherein this line is programmed into the high impedance state.

In practical solutions, the quantity of the bias current of the diodes is typically ca. 2 to 10 mA, depending e.g. on the type of the diodes D1–D4 as well as on the power levels used. In general, it can be stated that more bias current is needed in transmission than in reception, because a poorly biased PIN diode can produce harmonic distortion in a strong transmission signal. Also, losses in diodes are inversely proportional to the strength of the bias current. In the coupling of FIG. 4a, the resistances R1, R2 can be used to set the bias currents suitably, and these resistances R1, R2 may have different resistance value, if unequal bias currents are required in transmission and reception.

With the arrangement according to the present invention, it is possible to accomplish an optimal antenna matching in different use situations. This arrangement not only expands the service area of the wireless communication device but it also increases the talk time of the wireless communication device. For example, if the transmitter of the wireless communication device can reduce the transmission power by 2 dB as a result of better matching, the average power consumption of the power amplifier of the transmitter falls typically from 0.5 W to 0.32 W, presuming that the efficiency of the wireless communication device is ca. 50%.

It is obvious that in practical applications it is possible to use also more matching values in the matching means 9 than the two different matching values presented in the examples above. Thus, various switching arrangements can be used to select circuit solutions which affect the antenna matching and typically consist of capacitances and/or inductances dimensioned for different use situations.

It is obvious that the above-presented signal processing operations can be implemented also e.g. in the application software of the control means 7 instead of the signal processing means 6.

The present coupling is not limited solely to the embodiments presented above but it can be modified within the scope of the appended claims.

What is claimed is:

1. A system for matching an antenna for a wireless communication device, characterized in that it comprises:
   detecting means to detect the matching of the antenna by measuring the distance of the wireless communication device from objects in the vicinity of the wireless communication device at the time and means to generate a matching signal on the basis of the distance measurement,
   control means to examine said matching signal, to determine the need for matching, and to generate a control signal on the basis of said matching signal, and
   antenna matching means to adjust the matching of the antenna on the basis of said control signal.

2. A wireless communication device comprising at least an antenna, characterized in that the wireless communication device also comprises:
   detecting means to detect the matching of the antenna by measuring the distance of the wireless communication device from objects in the vicinity of the wireless communication device at the time and means to generate a matching signal on the basis of the distance measurement,
   control means to examine said matching signal, to determine the need for matching, and to generate a control signal on the basis of said matching signal, and
   antenna matching means to adjust the matching of the antenna on the basis of said control signal.

3. The wireless communication device according to claim 2, characterized in that said means to measure a distance comprise an infrared transmitter and an infrared receiver.

4. The wireless communication device according to claim 2, in which the antenna is arranged to be placed in at least two different positions, characterized in that said detecting means comprise means to examine the position of the antenna to generate said matching signal.

5. A method for matching the antenna of a wireless communication device, characterized in that in the method, the matching of the antenna is detected by measuring the distance of the wireless communication device from objects in the vicinity of the wireless communication device at the time, a matching signal is generated on the basis of the detected matching, said matching signal is examined to determined the need for matching the antenna, wherein a control signal is generated on the basis of said matching signal, and the matching of the antenna is adjusted on the basis of said control signal.

6. The method according to claim 5, in which the antenna can be placed in at least two different positions, characterized in that for generating said matching signal, the position of the antenna is examined.

7. A system for matching an antenna for a wireless communication device, said system comprising:
   antenna driving electronics,
   detecting means to detect the matching of the antenna by measuring the distance of the wireless communication device from objects in the vicinity of the wireless communication device at the time and means to generate a matching signal on the basis of the distance measurement,
   control means to examine said matching signal, to determine the need for matching, and to generate a control signal on the basis of said matching signal, and
   antenna matching means coupled to said driving electronics to adjust the matching of the antenna on the basis of said control signal so that as much as possible of the power of the antenna driving electronics radiates from the antenna.

8. A wireless communication device comprising at least an antenna, said wireless communication device comprising:
   antenna driving electronics,
   detecting means to detect the matching of the antenna by measuring the distance of the wireless communication device from objects in the vicinity of the wireless communication device at the time and means to generate a matching signal on the basis of the distance measurement,
   control means to examine said matching signal, to determine the need for matching, and to generate a control signal on the basis of said matching signal, and
   antenna matching means coupled to said driving electronics to adjust the matching of the antenna on the basis of said control signal so that as much as possible of the power of the antenna driving electronics radiates from the antenna.

9. The wireless communication device according to claim 8, wherein said means to measure a distance comprise an infrared transmitter and an infrared receiver.

10. The wireless communication device according to claim 8, in which the antenna is arranged to be placed in at least two different positions, wherein said detecting means comprise means to examine the position of the antenna to generate said matching signal.

11. A method for matching the antenna of a wireless communication device, wherein in the method, the matching of the antenna is detected by measuring the distance of the wireless communication device from objects in the vicinity of the wireless communication device at the time, a matching signal is generated on the basis of the detected matching, said matching signal is examined to determine the need for matching the antenna, wherein a control signal is generated on the basis of said matching signal, and the matching of the antenna is adjusted on the basis of said control signal so that as much as possible of the power of the antenna driving electronics radiates from the antenna.

12. The method according to claim 11, in which the antenna can be placed in at least two different positions, wherein for generating said matching signal, the position of the antenna is examined.

* * * * *